(12) United States Patent
Sugiyama et al.

(10) Patent No.: US 10,088,904 B2
(45) Date of Patent: Oct. 2, 2018

(54) DISPLAY INPUT DEVICE, INFORMATION PROCESSING APPARATUS, AND TOUCH PANEL DEVICE

(71) Applicant: KYOCERA Document Solutions Inc., Osaka-shi, Osaka (JP)

(72) Inventors: Yuichi Sugiyama, Osaka (JP); Wataru Shirai, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 42 days.

(21) Appl. No.: 14/894,948

(22) PCT Filed: May 28, 2014

(86) PCT No.: PCT/JP2014/064096
§ 371 (c)(1),
(2) Date: Nov. 30, 2015

(87) PCT Pub. No.: WO2014/192801
PCT Pub. Date: Dec. 4, 2014

(65) Prior Publication Data
US 2016/0103490 A1 Apr. 14, 2016

(30) Foreign Application Priority Data

May 30, 2013 (JP) ................................. 2013-114477
May 31, 2013 (JP) ................................. 2013-115148

(51) Int. Cl.
*G06F 3/041* (2006.01)
*G06F 3/01* (2006.01)
*H04N 1/00* (2006.01)

(52) U.S. Cl.
CPC ............ *G06F 3/016* (2013.01); *G06F 3/0416* (2013.01); *G06F 3/01* (2013.01); *G06F 3/041* (2013.01);
(Continued)

(58) Field of Classification Search
CPC combination set(s) only.
See application file for complete search history.

(56) References Cited

U.S. PATENT DOCUMENTS

| | | |
|---|---|---|
| 2002/0149561 A1 | 10/2002 | Fukumoto et al. |
| 2006/0022952 A1 | 2/2006 | Ryynanen |
| 2006/0109256 A1 | 5/2006 | Grant et al. |
| 2007/0097073 A1* | 5/2007 | Takashima .............. G06F 3/016 345/156 |

(Continued)

FOREIGN PATENT DOCUMENTS

| | | |
|---|---|---|
| JP | 2002149312 A | 5/2002 |
| JP | 2008516348 A | 5/2008 |

(Continued)

OTHER PUBLICATIONS

ISA Japanese Patent Office, International Search Report Issued in Application No. PCT/JP2014/064096, dated Aug. 26, 2014, WIPO, 3 pages.

*Primary Examiner* — Temesghen Ghebretinsae
*Assistant Examiner* — Sosina Abebe
(74) *Attorney, Agent, or Firm* — Alleman Hall Creasman & Tuttle LLP (57) ABSTRACT

In order to suppress reduction in vibration due to interference by use of a simple structure, a display input device (6) includes: a display portion (62); a touch panel (63) that is provided on an upper surface of the display portion (62) and detects a position of a touch operation; a plurality of piezoelectric elements (651 to 656) provided in a divided manner on a front surface and a back surface of the touch panel (63); and a drive portion (64) that drives the piezoelectric elements (651 to 656) in accordance with a touch operation on the touch panel (63), thereby to vibrate the touch panel (63).

4 Claims, 9 Drawing Sheets

(52) U.S. Cl.
CPC .... *G06F 2203/014* (2013.01); *H04N 1/00411* (2013.01)

(56) References Cited

U.S. PATENT DOCUMENTS

| | | | | |
|---|---|---|---|---|
| 2010/0117809 | A1* | 5/2010 | Dai | G06F 3/016 340/407.2 |
| 2010/0328053 | A1* | 12/2010 | Yeh | G06F 3/016 340/407.2 |
| 2010/0328229 | A1* | 12/2010 | Weber | G06F 1/1626 345/173 |
| 2010/0328230 | A1* | 12/2010 | Faubert | G06F 3/041 345/173 |
| 2011/0012717 | A1* | 1/2011 | Pance | G08B 6/00 340/407.2 |
| 2012/0194460 | A1* | 8/2012 | Kuwabara | G06F 3/041 345/173 |
| 2013/0215080 | A1* | 8/2013 | Takeda | G06F 3/041 345/174 |
| 2013/0222126 | A1* | 8/2013 | Aono | G08B 6/00 340/407.2 |
| 2014/0092350 | A1* | 4/2014 | Byeon | G02F 1/1339 349/106 |

FOREIGN PATENT DOCUMENTS

| | | |
|---|---|---|
| JP | 2011043925 A | 3/2011 |
| JP | 2011175364 A | 9/2011 |
| WO | 0212991 A1 | 2/2002 |
| WO | 2006042309 A1 | 4/2006 |
| WO | 2012053202 A1 | 4/2012 |

\* cited by examiner

DISPLAY INPUT DEVICE, INFORMATION PROCESSING APPARATUS, AND TOUCH PANEL DEVICE

TECHNICAL FIELD

The present invention relates to a display input device having a touch panel, a touch panel device, and an information processing apparatus.

BACKGROUND ART

Conventionally, there is known a display input device having a display portion on which touch keys associated with various kinds of operation contents are displayed, and a touch panel provided on the display portion, for detecting the position of a user's touch operation. A display input device of this type is used as a user interface of an information processing apparatus such as a copy machine, a facsimile device, a scanner device, a multifunction peripheral, a personal computer, or a tablet terminal, for example.

However, when operating a touch panel, a user cannot obtain a feeling of operation (click feeling) as if pressing a hardware key. Regarding this, there is known a technique of transferring a feeling of operation to a user by vibrating a touch panel when the touch panel is operated (refer to Patent Literatures 1 and 2, for example).

CITATION LIST

Patent Literature

[PTL 1] Japanese Laid-Open Patent Publication No. 2002-149312
[PTL 2] Japanese Laid-Open Patent Publication No. 2011-175364

SUMMARY OF THE INVENTION

Problems to be Solved by the Invention

By the way, as a technique of vibrating a touch panel, it is conceivable to provide the touch panel with a plurality of piezoelectric elements. In this case, if each of the piezoelectric elements is disposed on one surface of the touch panel, vibrations transferred from the plurality of piezoelectric elements to the touch panel interfere with each other, which may cause a portion where vibration is reduced. For example, in a case where three piezoelectric elements aligned in parallel are simultaneously driven with the same voltage waveform, vibration of the piezoelectric element at the center is canceled by vibrations of the other two piezoelectric elements. Regarding this, it is conceivable to suppress the interference of vibrations by, for example, inputting drive signals of different voltage waveforms to the respective piezoelectric elements. In this case, however, the circuit configuration or processing becomes complicated.

An object of the present invention is to provide: a display input device capable of suppressing reduction in vibration due to interference by use of a simple structure in a configuration of vibrating a touch panel by use of a plurality of piezoelectric elements; an information processing apparatus including the display input device; and a touch panel device.

Solution to the Problems

A display input device according to an aspect of the present invention includes a display portion, a touch panel, a plurality of piezoelectric elements, and a drive portion. The touch panel is provided on an upper surface of the display portion, and detects a position of a touch operation. The plurality of piezoelectric elements are provided in a divided manner on a front surface and a back surface of the touch panel. The drive portion drives the piezoelectric elements in accordance with a touch operation on the touch panel, thereby to vibrate the touch panel.

An information processing apparatus according to another aspect of the present invention includes the above-mentioned display input device.

A touch panel device according to still another aspect of the present invention includes a display portion, a plurality of elastic members, a touch panel, and a plurality of piezoelectric elements. The display portion displays a screen. The plurality of elastic members are provided on an upper surface of the display portion. The touch panel is fixed to upper surfaces of the plurality of elastic members. The piezoelectric elements vibrate the touch panel. The upper surfaces of the plurality of elastic members are set to have heights at two or more levels, and the touch panel is fixed in a curved state.

Advantageous Effects of the Invention

The present invention realizes: a display input device capable of suppressing reduction in vibration due to interference by use of a simple structure in a configuration of vibrating a touch panel by use of a plurality of piezoelectric elements; an information processing apparatus including the display input device; and a touch panel device.

DESCRIPTION OF EMBODIMENTS

[First Embodiment]

[Schematic Structure of Multifunction Peripheral 10]

Figure 1A:
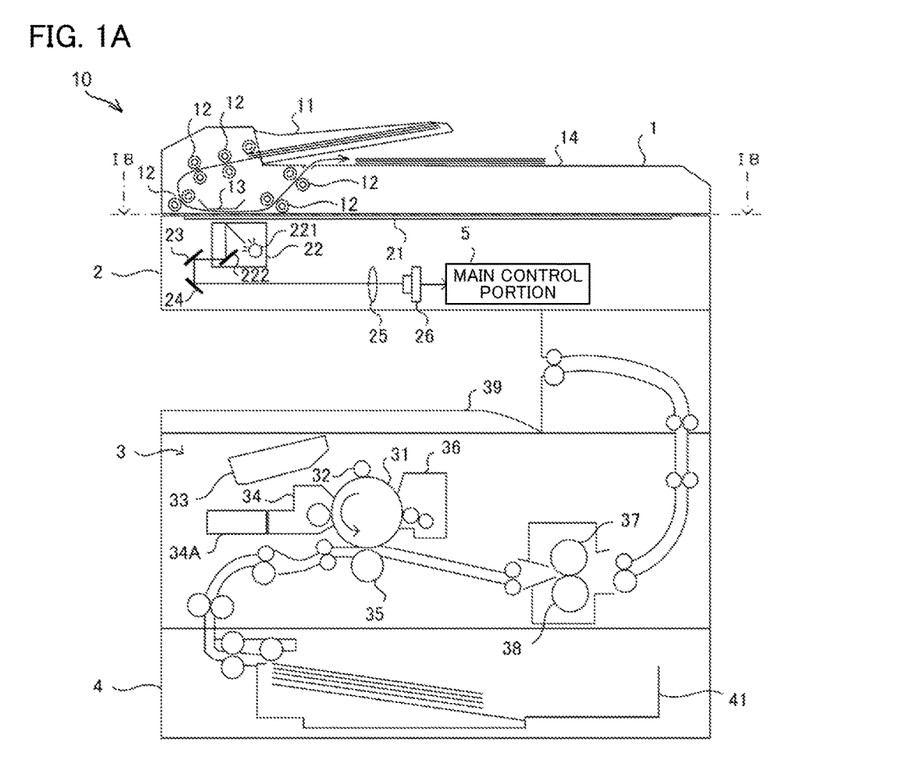
FIG. 1A is a schematic diagram showing a structure of an information processing apparatus according to an embodiment of the present invention.

First, the schematic structure of the multifunction peripheral 10 according to an embodiment of the present invention will be described with reference to FIG. 1 and FIG. 2. FIG. 1A is a schematic front view showing the structure of the multifunction peripheral 10, and FIG. 1B is a view as seen from a B-B arrow direction in FIG. 1A.

Figure 1B:
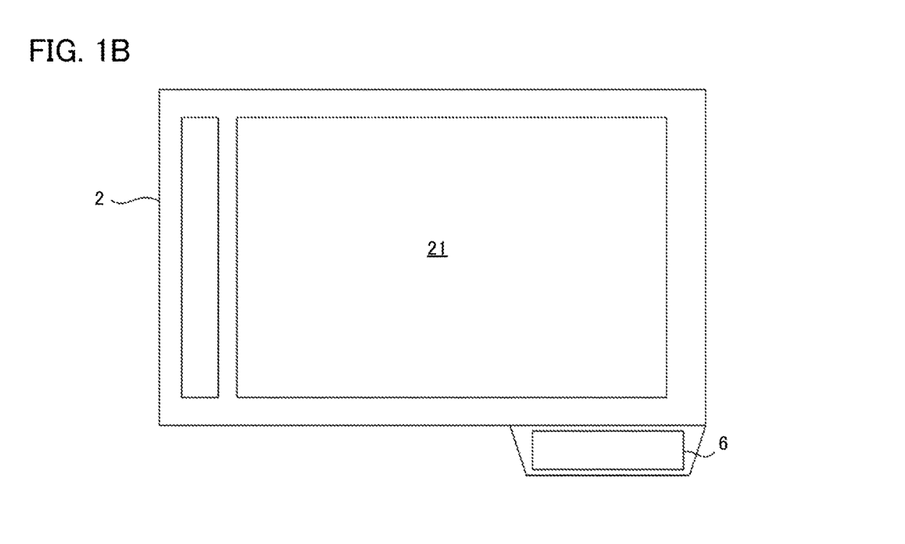
FIG. 1B is a schematic diagram showing the structure of the information processing apparatus according to the embodiment of the present invention.
Figure 2:
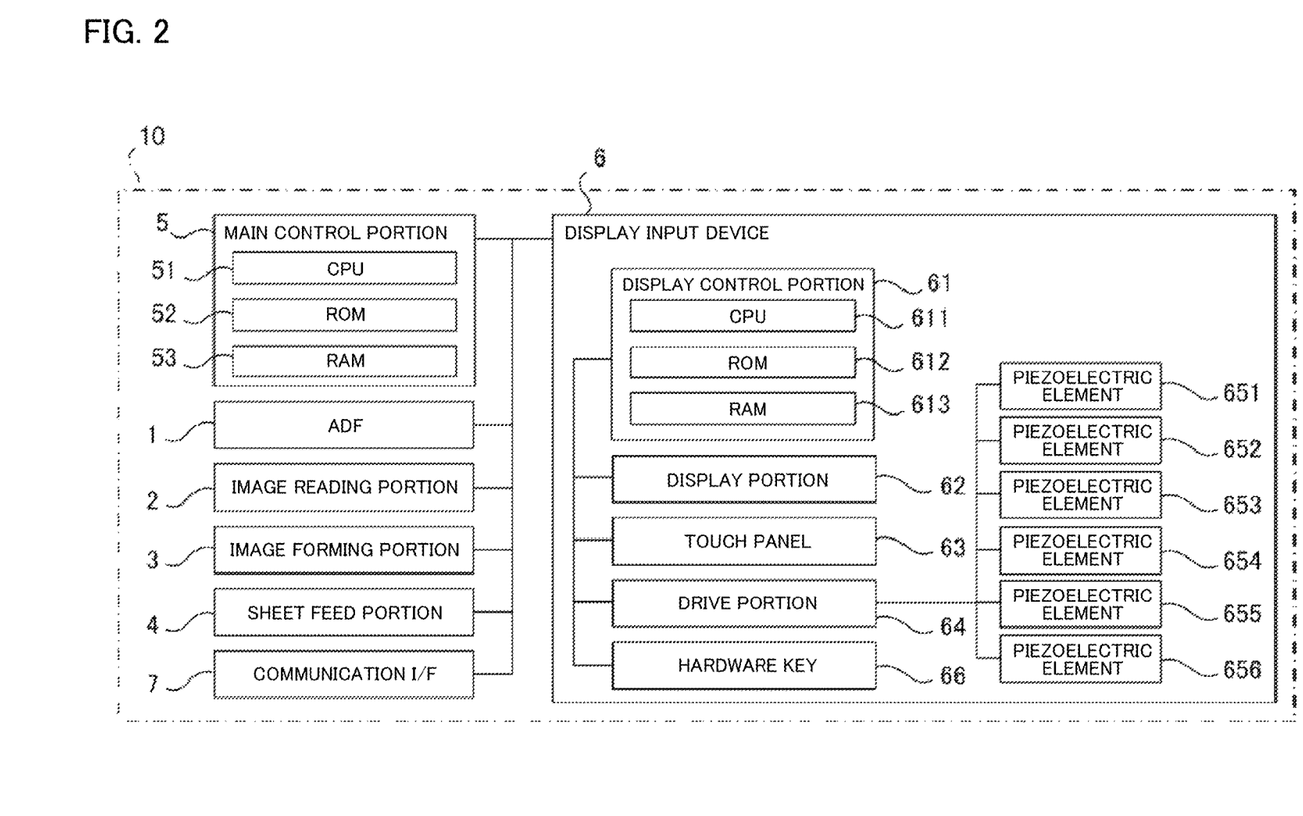
FIG. 2 is a block diagram showing a hardware structure of the information processing apparatus according to the embodiment of the present invention.

As shown in FIG. 1 and FIG. 2, the multifunction peripheral 10 is an image forming apparatus including an ADF 1, an image reading portion 2, an image forming portion 3, a sheet feed portion 4, a main control portion 5, a display input device 6, a communication I/F 7, and the like. The multifunction peripheral 10 is an example of an information processing apparatus according to the present invention. The present invention is also applicable to an information processing apparatus such as a printer, a facsimile, a copy machine, a personal computer, a tablet terminal, a smartphone, or a mobile phone.

The ADF 1 is an automatic document feeder including a document set portion 11, a plurality of conveyance rollers 12, a document presser 13, and a sheet discharge portion 14, as shown in FIG. 1. In the ADF 1, each conveyance roller 12 is driven by a motor (not shown), whereby a document placed on the document set portion 11 passes under a lower surface of the document presser 13 which corresponds to a position for reading image data by the image reading portion 2, and then is conveyed to the sheet discharge portion 14. Thus, the image reading portion 2 can read image data from the document conveyed by the ADF 1.

The image reading portion 2 includes a document table 21, a reading unit 22, mirrors 23 and 24, an optical lens 25, and a CCD (Charge Coupled Device) 26. The document table 21 is a placement portion for a document, provided on an upper surface of the image reading portion 2. The reading unit 22 includes an LED light source 221 and a mirror 222, and is movable in a sub scanning direction (right-left direction in FIG. 1) by a motor (not shown). The LED light source 221 includes multiple white LEDs disposed along a main scanning direction (depth direction in FIG. 1). The mirror 222 reflects, toward the mirror 23, light emitted from the LED light source 221 and then reflected by a surface of a document present at the reading position on the document table 21. Then, the light reflected by the mirror 222 is guided into the optical lens 25 by the mirrors 23 and 24. The optical lens 25 converges the entering light into the CCD 26. The CCD 26 has a photoelectric conversion element and the like for inputting, as image data of a document, an electric signal corresponding to the reception amount of light entering from the optical lens 25, to the main control portion 5.

The image forming portion 3 is an image forming portion of electrophotographic type that executes image forming processing (print processing) based on image data read by the image reading portion 2 or image data inputted from an external information processing apparatus such as a personal computer. Specifically, as shown in FIG. 1, the image forming portion 3 includes a photosensitive drum 31, a charging device 32, an exposure device (LSU) 33, a developing device 34, a transfer roller 35, a cleaning device 36, a fixing roller 37, a pressure roller 38, and a sheet discharge tray 39. In the image forming portion 3, by the following procedure, an image is formed on a sheet fed from a sheet feed cassette 41 which is attachable to and detachable from the sheet feed portion 4, and then the sheet having the image formed thereon is discharged to the sheet discharge tray 39.

First, the photosensitive drum 31 is uniformly charged at a predetermined potential by the charging device 32. Next, light based on image data is applied to a surface of the photosensitive drum 31 by the exposure device 33. Thus, an electrostatic latent image corresponding to the image data is formed on the surface of the photosensitive drum 31. Then, the electrostatic latent image on the photosensitive drum 31 is developed (visualized) as a toner image by the developing device 34. Toner (developer) is supplied to the developing device 34 from a toner container 34A which is attachable to and detachable from the image forming portion 3. Subsequently, the toner image formed on the photosensitive drum 31 is transferred onto a sheet by the transfer roller 35. Thereafter, the toner image transferred onto the sheet is heated by the fixing roller 37 to be melted and fixed, while the sheet passes between the fixing roller 37 and the pressure roller 38. The remaining toner on the surface of the photosensitive drum 31 is removed by the cleaning device 36.

The main control portion 5 has a CPU 51, a ROM 52, and a RAM 53, as shown in FIG. 2. The CPU 51 is a processor that executes various operation processes. The ROM 52 is a nonvolatile storage portion in which information such as a control program for causing the CPU 51 to execute various processes is stored in advance. The RAM 53 is a volatile storage portion and is used as a temporary storage memory (working area) for various processes executed by the CPU 51.

The communication I/F 7 is an interface for executing data communication with an external device connected to the multifunction peripheral 10 via a communication network such as the Internet or a LAN.

[Structure of Display Input Device]

Next, the display input device 6 will be described with reference to FIGS. 2 to 4. FIG. 4A is a plan view of a touch panel 63 of the display input device 6, and FIG. 4B is a left side view of the touch panel 63 of the display input device 6.

Figure 3:
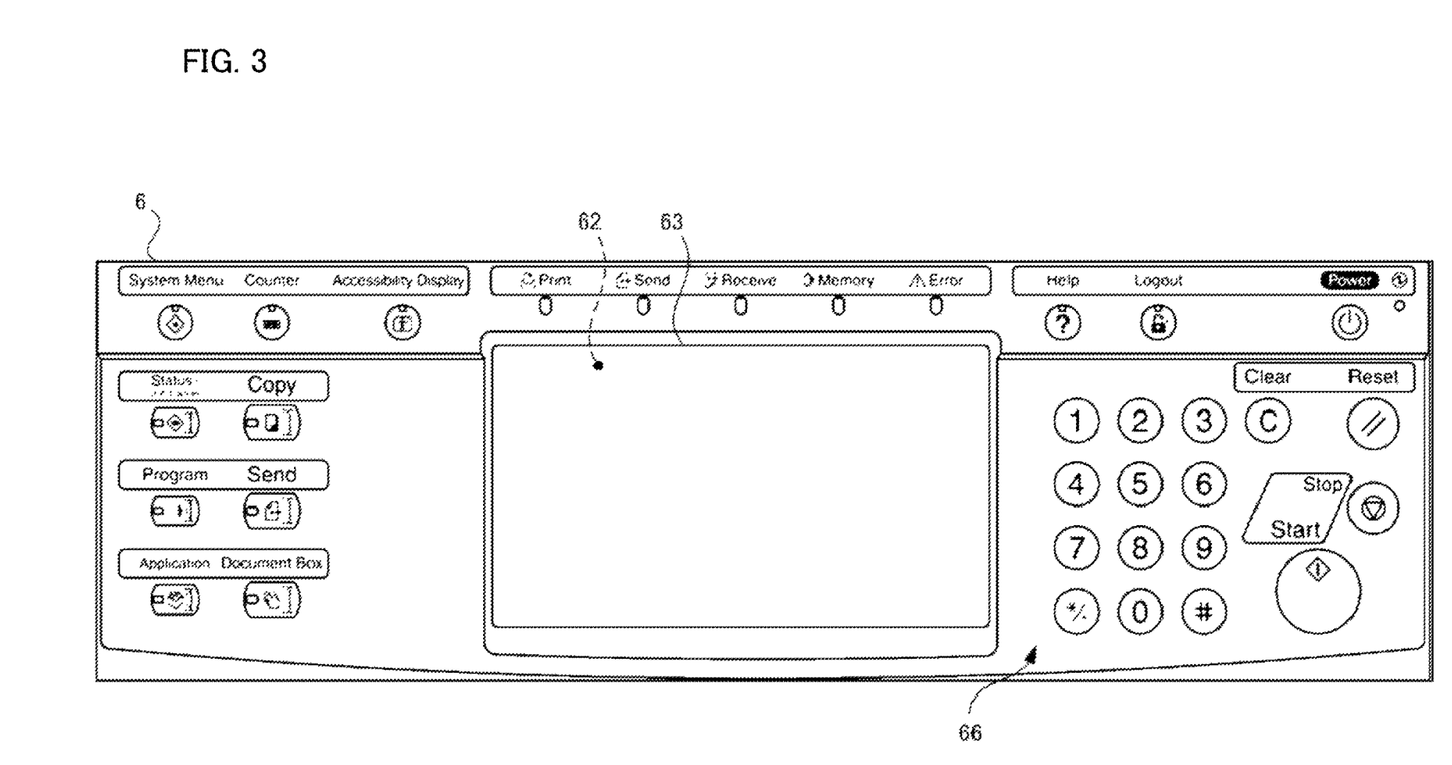
FIG. 3 is a plan view of a display input device according to the embodiment of the present invention.
Figure 4A:
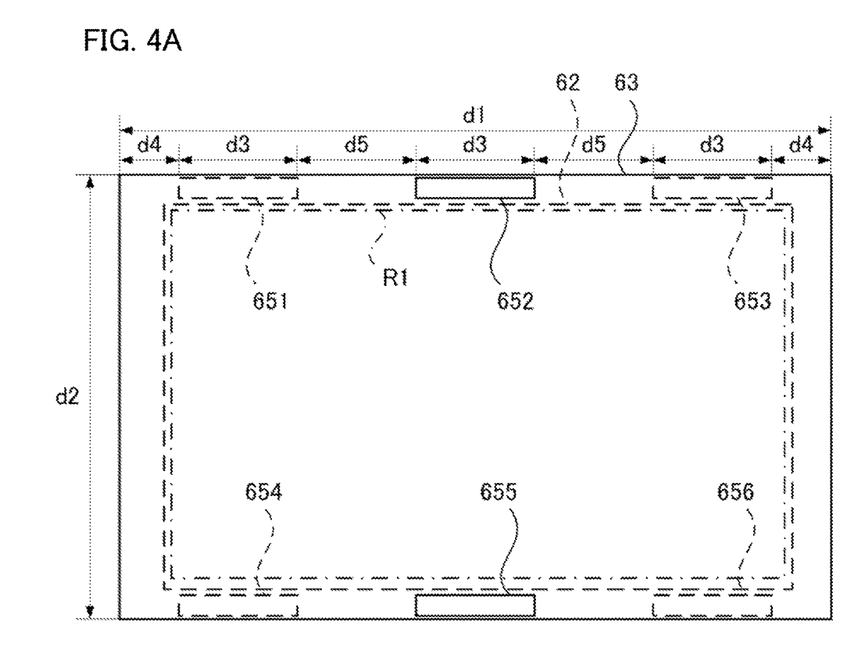
FIG. 4A is a diagram showing a structure of a touch panel according to the embodiment of the present invention.
Figure 4B:
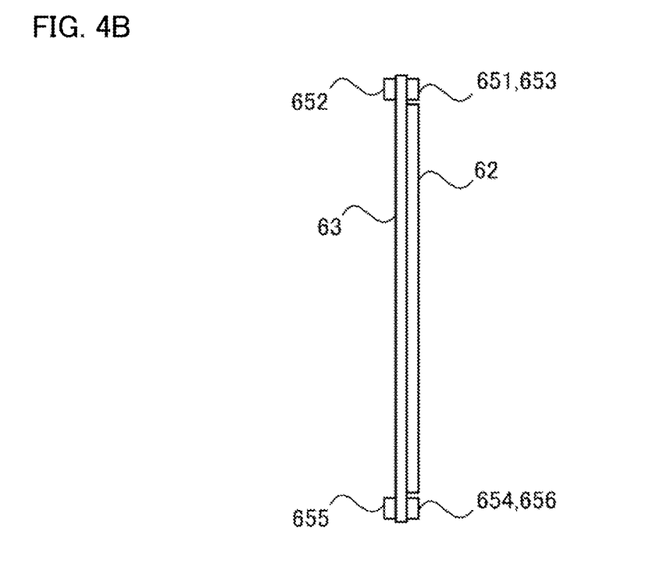
FIG. 4B is a diagram showing the structure of the touch panel according to the embodiment of the present invention.

As shown in FIGS. 2 to 4, the display input device 6 includes a display control portion 61, a display portion 62, the touch panel 63, a drive portion 64, a plurality of piezoelectric elements 651 to 656, and hardware keys 66. As shown in FIG. 3, the hardware keys 66 include various operation buttons such as numerical keys and a start key, and input an operation signal of each operation button to the display control portion 61.

As shown in FIG. 2, the display control portion 61 has a CPU 611, a ROM 612, and a RAM 613, and controls an operation of the display input device 6 by causing the CPU 611 to execute a predetermined control program stored in the ROM 612. The RAM 613 is a volatile storage portion and is used as a temporary storage memory for various processes executed by the CPU 611. The display control portion 61 may be an electric circuit such as ASIC or DSP. In another embodiment, the main control portion 5 may also have the function of the display control portion 61.

The display control portion 61 causes the display portion 62 to display various kinds of information in accordance with a control instruction from the main control portion 5. The display portion 62 is, for example, a liquid crystal display panel or an organic EL display. The display portion 62 is controlled by the display control portion 61 to display various kinds of information. On the display portion 62, various kinds of information such as touch keys and setting screens associated with various operation contents are displayed.

Further, the display control portion 61 inputs various kinds of information to the main control portion 5 in accordance with a touch operation on the touch panel 63 or an operation on the hardware key 66 by a user. As shown in FIG. 4B, the touch panel 63 is provided on an upper surface of the display portion 62. In addition, the outer diameter of the touch panel 63 is greater than that of the display portion 62. Specifically, as for the outer diameter of the touch panel 63, a horizontal dimension d1 is 240 mm, and a vertical dimension d2 is 149 mm. A region R1 shown in FIG. 4A is a region where the touch panel 63 is exposed on the display input device 6. A region outside the region R1 is covered with a housing of the display input device 6 so that the outside region is invisible to a user who operates the display input device 6.

The touch panel 63 detects the position of a user's touch operation, and inputs the detected position to the display control portion 61. As a result, the display control portion 61 can input, to the main control portion 5, information that is set in advance as an operation content associated with the position of the touch operation on a current display screen of the display portion 62. The touch panel 63 is an electrostatic capacitance type touch panel which detects an operation position based on change in electrostatic capacitance, or a resistive film type touch panel which detects an operation position based on change in resistance.

When a user's touch operation to the touch panel 63 is detected, the drive portion 64 applies a drive signal of a predetermined voltage waveform to the respective piezoelectric elements 651 to 656, thereby vibrating the piezoelectric elements 651 to 656. More specifically, the drive portion 64 is able to simultaneously input the drive signal of the same voltage waveform to the respective piezoelectric elements 651 to 656. Each of the piezoelectric elements 651 to 656 is composed of a piezoelectric body of a piezoelectric ceramic such as PZT (lead zirconate titanate), and a pair of electrodes sandwiching this. Each of the piezoelectric elements 651 to 656 is displaced in accordance with the drive signal applied from the drive portion 64 to generate vibration. The voltage waveform of the drive signal is, for example, a sine wave, a rectangular wave, a triangle wave, or a saw-tooth wave.

As described above, in the display input device 6, when each of the piezoelectric elements 651 to 656 is driven to vibrate, vibration is transferred from each of the piezoelectric elements 651 to 656 to the touch panel 63, and the vibration of the touch panel 63 is transferred to a user. Therefore, the user can obtain a feeling of operation by the vibration of the touch panel 63 when operating the touch panel.

Further, as shown in FIG. 4A, the three piezoelectric elements 651 to 653 are disposed at a predetermined interval at an upper end portion (one end in the short-side direction) of the touch panel 63 along the long-side direction of the touch panel 63. Specifically, a dimension d3 in the long-side direction of each of the piezoelectric elements 651 to 653 is 40 mm. A separation distance d4 of the piezoelectric element 651 from a left end portion of the touch panel 63 is 20 mm, and a separation distance d4 of the piezoelectric element 653 from a right end portion of the touch panel 63 is 20 mm. An arrangement interval d5 between the piezoelectric elements 651 to 653 is 40 mm. Likewise, the three piezoelectric elements 654 to 656 are disposed at a predetermined interval at a lower end portion (one end in the short-side direction) of the touch panel 63 along the long-side direction of the touch panel 63. The piezoelectric elements 651 to 656 are located in a region outside the region R1 so that they are invisible to a user. In addition, the piezoelectric elements 651 to 653 and the piezoelectric elements 654 to 656 are located so as to respectively oppose each other in the short-side direction of the touch panel 63.

In the display input device 6, the three piezoelectric elements 651 to 653 and the three piezoelectric elements 654 to 656 are disposed along the long-side direction of the touch panel 63. However, the number of the piezoelectric elements is not limited thereto. That is, when a plurality of piezoelectric elements are mounted to the display input device 6, the piezoelectric elements may be disposed on the front surface and the back surface of the touch panel 63 so that vibration in the touch panel 63 is not reduced even when the same drive signal is applied to the respective piezoelectric elements. As a matter of course, in another embodiment, the piezoelectric elements 651 to 656 may be disposed on the front surface and the back surface of the touch panel 63, and different drive signals may be applied to the piezoelectric elements 651 to 656.

In the display input device 6, the piezoelectric elements 651 to 653 are disposed in a divided manner on the front surface and the back surface of the touch panel 63. Specifically, among the piezoelectric elements 651 to 653, the piezoelectric element 651 and the piezoelectric element 653 at the both ends are disposed in contact with the back surface of the touch panel 63. On the other hand, in the display input device 6, among the piezoelectric elements 651 to 653, the piezoelectric element 652 at the center is disposed in contact with the front surface of the touch panel 63.

Likewise, among the piezoelectric elements 654 to 656, the piezoelectric element 654 and the piezoelectric element 656 at the both ends are disposed in contact with the back surface of the touch panel 63. On the other hand, in the display input device 6, among the piezoelectric elements 654 to 656, the piezoelectric element 655 at the center is disposed in contact with the front surface of the touch panel 63.

In the display input device 6, it is also conceivable that the piezoelectric elements 651, 653, 654 and 656 are disposed in contact with the front surface of the touch panel 63, while the piezoelectric elements 652 and 655 are disposed in contact with the back surface of the touch panel 63. That is, among the piezoelectric elements 651 to 656 disposed in contact with the touch panel 63, the piezoelectric elements at the center and the piezoelectric elements at the left and right sides may be disposed in a divided manner on the front surface and the back surface, respectively.

In the display input device 6 configured as described above, when the drive signal is simultaneously inputted to the piezoelectric elements 651 to 656 from the drive portion 64, the touch panel 63 is vibrated due to vibrations of the piezoelectric elements 651 to 656. At this time, vibration is transferred to the front surface of the touch panel 63 from the piezoelectric element 652 and the piezoelectric element 655, while vibration is transferred to the back surface of the touch panel 63 from the piezoelectric elements 651, 653, 654, and 656. Therefore, vibrations of opposite phases are applied to the touch panel 63 by the piezoelectric elements 651, 653 and the piezoelectric element 652. Likewise, vibrations of opposite phases are applied to the touch panel 63 by the piezoelectric element 654, 656 and the piezoelectric element 655.

Therefore, in the touch panel 63, interference of the vibrations of the piezoelectric elements 651 to 653 is suppressed, and particularly, reduction in vibration at a center portion of the touch panel 63 is suppressed. Thereby, the display input device 6 can give a feeling of operation to a user when the user operates the touch panel 63. Further, in the display input device 6, the drive portion 64 may simultaneously apply the same drive signal to the respective piezoelectric elements 651 to 656. Accordingly, the display input device 6 need not apply drive signals of different phases or frequencies to the respective piezoelectric elements 651 to 656, and therefore can be implemented with a simple structure.

Figure 5:
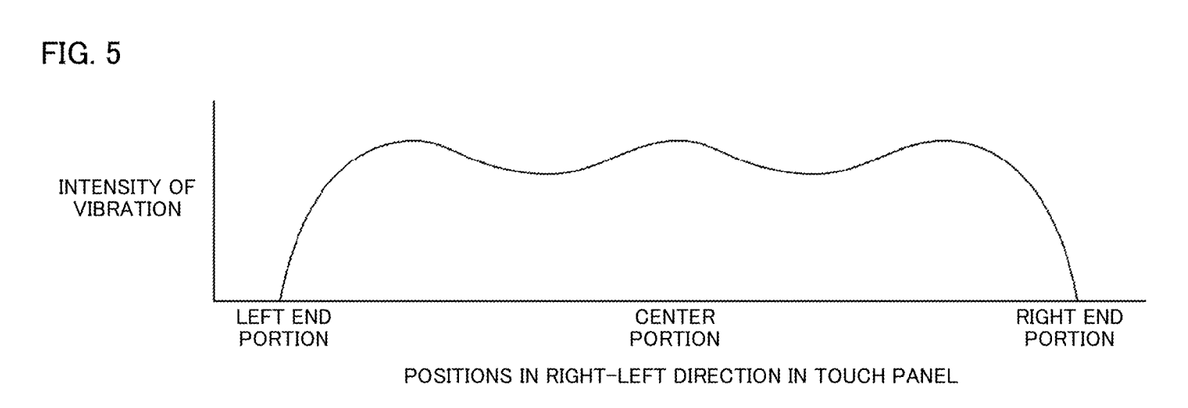
FIG. 5 is a diagram showing an example of the relationship between the amount of vibration and the position in the display input device according to the embodiment of the present invention.

FIG. 5 is a diagram showing the relationship between the position on the touch panel 63 in the long-side direction and the intensity of vibration, in the case where the same drive signal is simultaneously applied to the piezoelectric elements 651 to 656 in the display input device 6. As shown in FIG. 5, in the touch panel 63, not only the left and right end portions but also the center portion vibrate, which means that a feeling of operation is given to the user over the entire touch panel 63.

Figure 6:
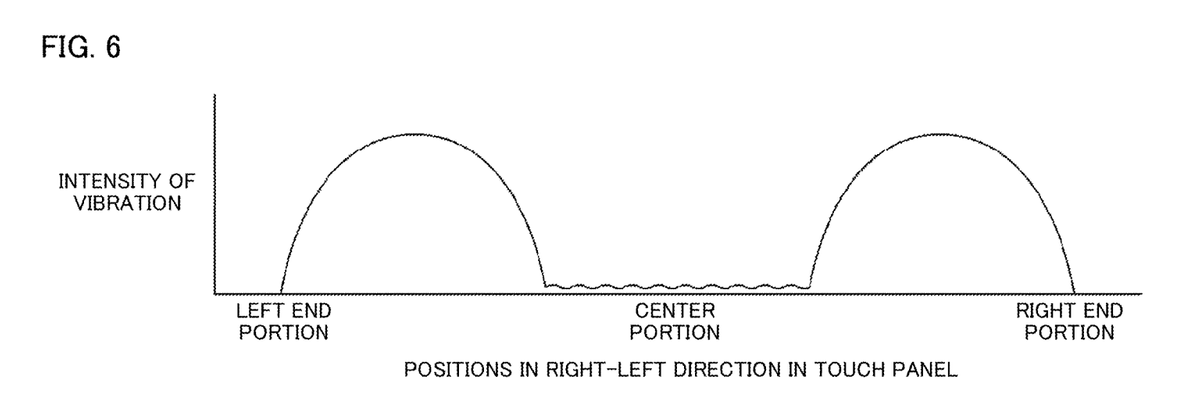
FIG. 6 is a diagram showing an example of the relationship between the amount of vibration and the position in another example of arrangement of piezoelectric elements.

On the other hand, FIG. 6 is a diagram showing the relationship between the position on the touch panel 63 in the long-side direction and the intensity of vibration, in the case where all the piezoelectric elements 651 to 656 are disposed on the same surface (front surface or back surface) of the touch panel 63 and where the drive signal is simultaneously applied to the piezoelectric elements 651 to 656. As shown in FIG. 6, in the touch panel 63, vibration at the center portion is reduced due to interference of vibrations caused by the piezoelectric element 651 (654), the piezoelectric element 653 (656), and the piezoelectric element 652 (655), and a feeling of operation given to the user is small.

[Second Embodiment]

In recent years, for a touch panel apparatus having a touch panel being provided on a display portion, a technique called forced feedback has been proposed which provides feedback of tactile sensation from an operation key being pressed by an operator, to the operator. For example, a piezoelectric element is provided on a touch panel. When an operator performs a touch input on an operation screen of the touch panel, a voltage is applied to the piezoelectric element, whereby the piezoelectric element is contractively deformed to vibrate the touch panel, so that feedback of tactile sensation is made to the operator.

However, in order to vibrate an entire screen of a large-sized touch panel such as a 8.5-inch-wide panel or a 10.1-inch-wide panel, a plurality of vibration devices need to be disposed and driven simultaneously. In the case where the plurality of vibration devices are simultaneously driven, an influence range of one vibration device may be subjected to vibration interference from an influence range of an adjacent vibration device, which may cause variation in tactile sensation depending on the position of touch input. In contrast, in a touch panel device 300 according to the present embodiment, uniform tactile sensation can be realized even when a plurality of vibration devices are simultaneously driven.

Figure 7:
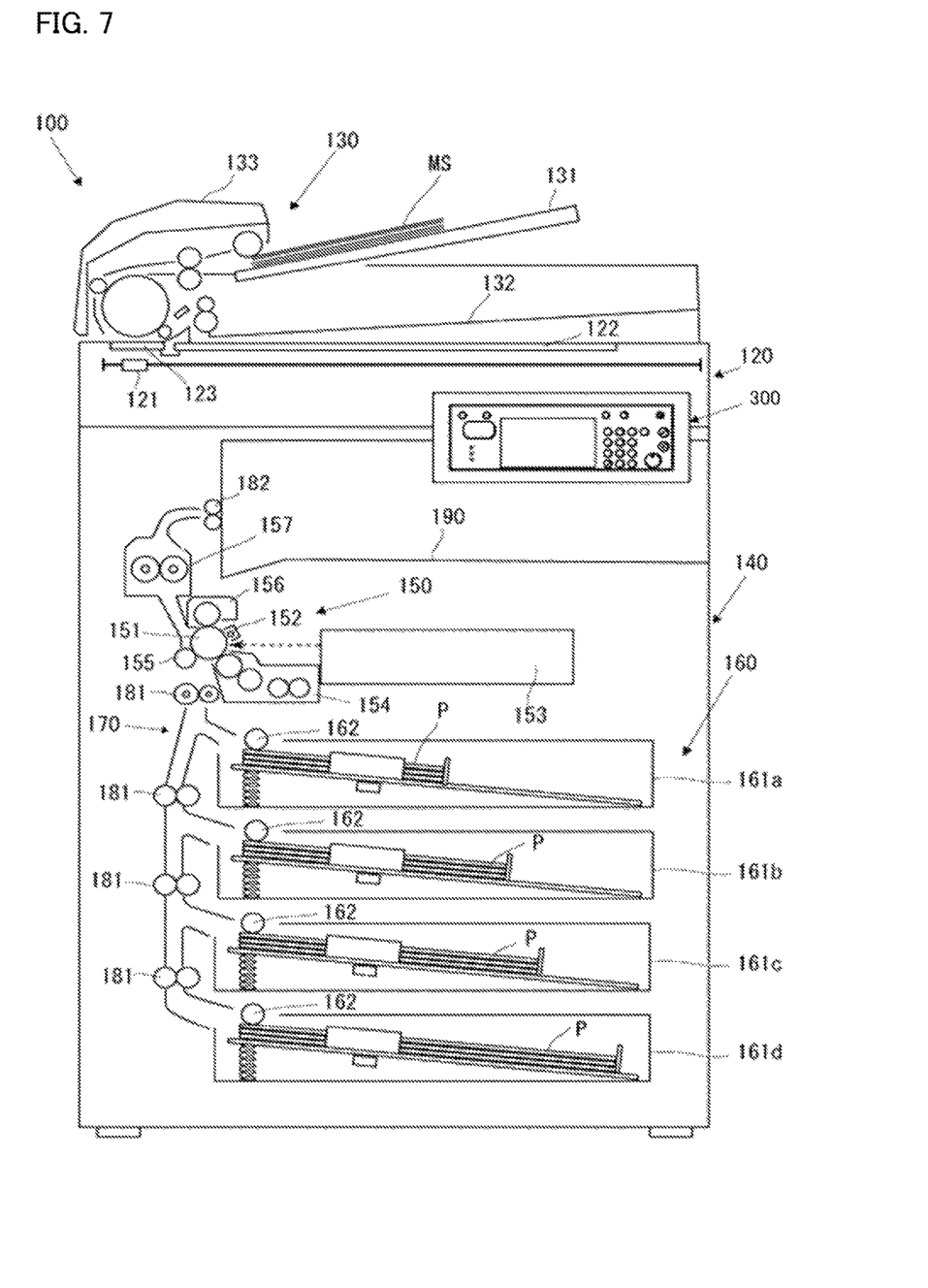
FIG. 7 is a perspective view showing an example of a structure of an image forming apparatus on which a touch panel device according to the embodiment of the present invention is mounted.

An image forming apparatus 100 on which the touch panel device 300 according to the present embodiment is mounted is a copy machine, and includes a document reading portion 120, a document feeding portion 130, and a recording portion 140 as shown in FIG. 7. The document reading portion 120 is disposed above the recording portion 140, and the document feeding portion 130 is disposed above the document reading portion 120. The image forming apparatus 100 is described herein as a copy machine. However, the image forming apparatus 100 may be a scanner, a multifunction peripheral, or the like.

Figure 8:
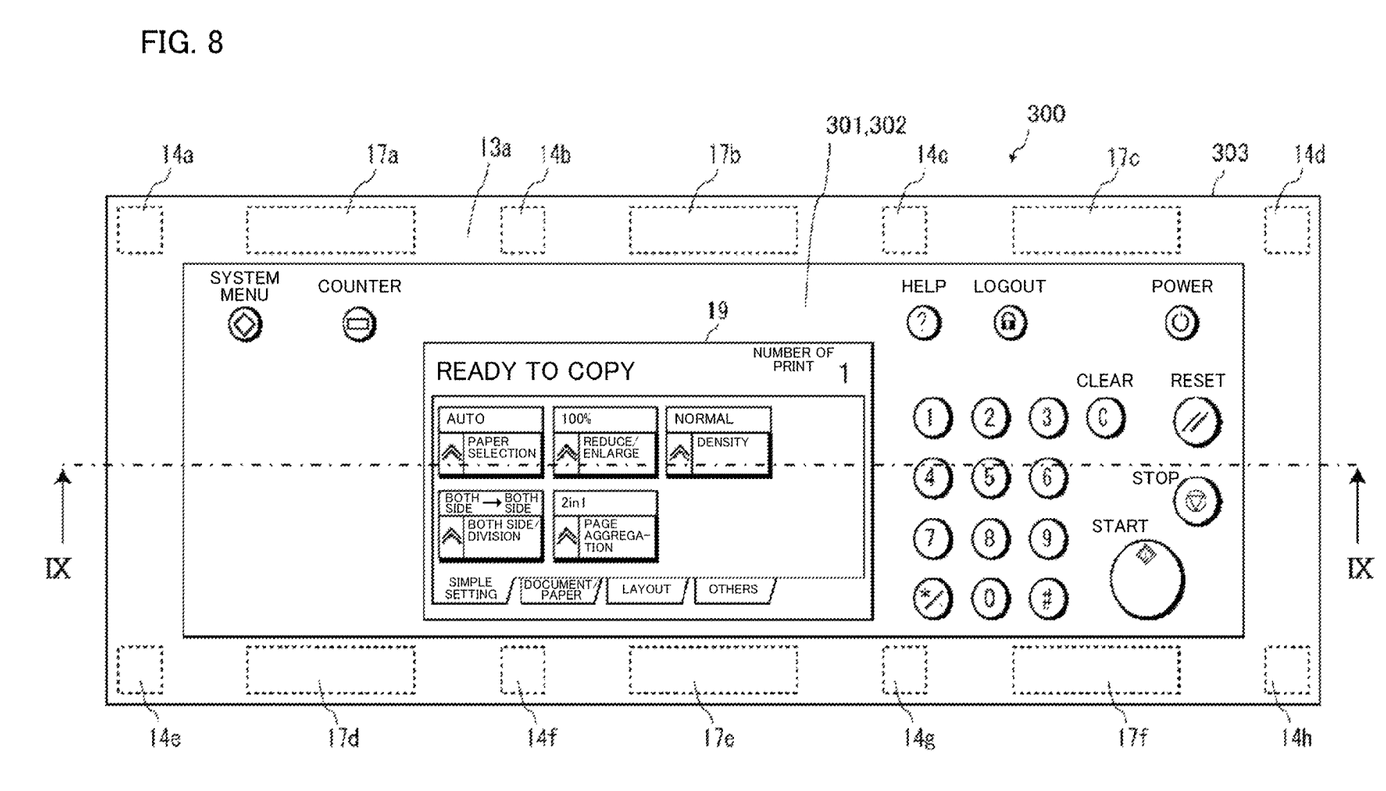
FIG. 8 is a plan view showing an example of a structure of the touch panel device shown in FIG. 7.
Figure 9:
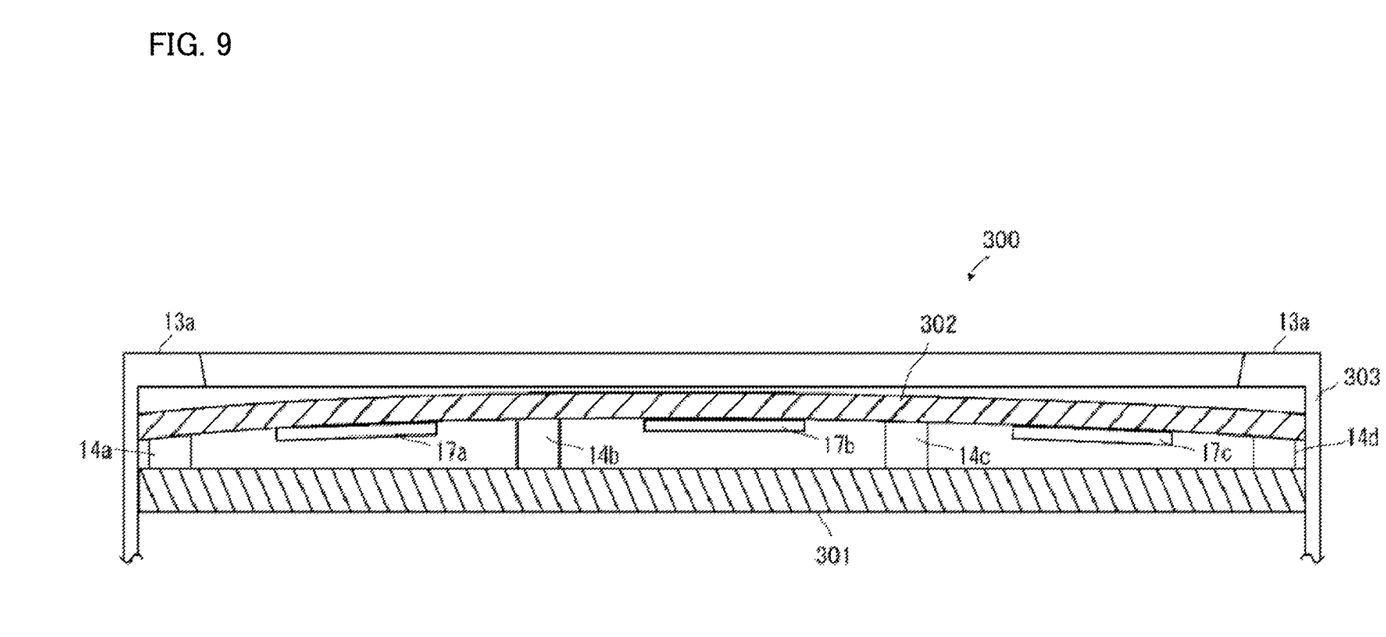
FIG. 9 is a cross-sectional view taken along a line IX-IX in FIG. 8.

The touch panel device 300 which performs settings and operation instructions of the image forming apparatus 100 is provided on the front surface side of the image forming apparatus 100. With reference to FIGS. 8 and 9, the touch panel device 300 includes a display portion 301 and a touch panel 302. The display portion 301 displays various operation keys that accept an operation input. The touch panel 302 is provided on a display surface of the display portion 301. The touch panel 302 detects a touch input by pressing with an operator's fingertip, a stylus pen, or the like, and outputs a signal corresponding to the position where the touch input is detected, thereby accepting an operation performed to an operation key displayed on the display portion 301. The display portion 301 and the touch panel 302 have substantially the same shape which is a rectangle having a short side in the vertical direction and a long side in the horizontal direction. As the display portion 301, a liquid crystal display panel can be used, for example. As the touch panel 302, a touch panel of a resistive film type or an electrostatic capacitance type can be used, for example.

With reference to FIG. 9, the display portion 301 is stored and supported in a housing 303. The housing 303 is provided with an upper cover 13a that covers peripheral regions of the display portion 301 and the touch panel 302. On the display portion 301, the touch panel 302 is held via a plurality of elastic members 14a to 14h disposed on the part covered with the upper cover 13a. The elastic members 14a to 14h are made of a resin such as rubber. Upper surfaces of the elastic members 14a to 14h serve as fixing surfaces to which the touch panel 302 is fixed. The touch panel 302 is fixed by an adhesive applied to the upper surfaces of the elastic members 14a to 14h. In the present embodiment, the elastic members 14a to 14d and the elastic members 14e to 14h are disposed on the part covered with the upper cover 13a so as to oppose each other in the short-side direction.

The heights of the elastic members 14a to 14h, that is, the heights from the display portion 301 to the fixing surfaces of the elastic members 14a to 14h, are set at different two or more levels. In the present embodiment, the heights of the elastic members 14a to 14h are set at different two levels such that the heights of the elastic members 14b, 14c, 14f, and 14g are set to be larger than the heights of the elastic members 14a, 14d, 14e, and 14h. Thus, the touch panel 302 is fixed with the center portion thereof in the long-side direction being curved upward.

Further, piezoelectric elements 17a to 17f are adhered to the back surface of the touch panel 302 at the part covered with the upper cover 13a. The piezoelectric elements 17 function as vibration portions that vibrate the touch panel 302. In the present embodiment, the piezoelectric element 17a to 17c and the piezoelectric element 17d to 17f are disposed on the part covered with the upper cover 13a so as to oppose each other in the short-side direction.

With reference to FIG. 8, the touch panel device 300 is provided with permanent operation keys such as numerical keys that allow input of a numerical value such as the number of copies, a reset key that allows input of an instruction for initializing setting information, a stop key for stopping a copy operation or clearing an inputted numerical value, and a start key that allows input of an output instruction for starting a print operation, and a display region 19 on which the state of the image forming apparatus 100 and various operation screens are displayed.

With reference to FIG. 7, the document reading portion 120 includes a scanner 121, a platen glass 122, and a document reading slit 123. The scanner 121 is composed of an exposure lamp, a CCD (Charge Coupled Device) sensor and the like, and is movable along a conveying direction in which a document MS is conveyed by the document feeding portion 130. The platen glass 122 is a document table composed of a transparent member such as glass. The document reading slit 123 has a slit that is formed in a direction orthogonal to the conveying direction in which the document MS is conveyed by the document feeding portion 130.

When reading the document MS placed on the platen glass 122, the scanner 121 is moved to a position facing the platen glass 122. The scanner 121 reads the document MS while scanning the document MS placed on the platen glass 122, to obtain image data, and outputs the obtained image data to the recording portion 140. When reading the document MS conveyed by the document feeding portion 130, the scanner 121 is moved to a position facing the document reading slit 123. The scanner 121 reads the document MS through the document reading slit 123, in synchronization with the conveying operation of the document MS by the document feeding portion 130, to obtain image data, and outputs the obtained image data to the recording unit 140.

The document feeding portion 130 includes a document placement portion 131, a document discharge portion 132, and a document conveying mechanism 133. The document MS placed on the document placement portion 131 is sequentially fed sheet by sheet and conveyed to a position facing the document reading slit 123 of the document reading portion 120, by the document conveying mechanism 133. Thereafter, the document MS is discharged to the document discharge portion 132. The document feeding portion 130 is configured to be tiltable so that the upper surface of the platen glass 122 can be opened by the document feeding portion 130 being lifted up.

The recording portion 140 includes an image forming portion 150, and also includes a sheet feed portion 160, a sheet conveyance path 170, a conveying roller 181, a discharge roller 182, and a discharge tray 190.

The sheet feed portion 160 includes a plurality of sheet feed cassettes 161a to 161d for accommodating recording sheets P, and a sheet feed roller 162 for feeding the recording sheets P one by one from each of the sheet feed cassettes 161a to 161d to the sheet conveyance path 170. The sheet feed roller 162, the conveying roller 181, and the discharge roller 182 function as a conveyance portion, whereby a recording sheet P is conveyed. The recording sheet P fed by the sheet feed roller 162 to the sheet conveyance path 170 is conveyed by the conveying roller 181 to the image forming portion 150. Then, the recording sheet P having some record applied thereto by the image forming portion 150 is discharged by the discharge roller 182 to the outside of the machine. The recording sheet P having some record applied thereto is guided by the discharge roller 182 to the discharge tray 190.

The image forming portion 150 includes a photosensitive drum 151, a charging portion 152, an exposure portion 153, a developing portion 154, a transfer portion 155, a cleaning portion 156, and a fixing portion 157. The exposure portion 153 is an optical unit provided with a laser device, a mirror, and the like. The exposure portion 153 outputs a laser beam based on the image data and exposes the photosensitive drum 151 charged by the charging portion 152, thereby forming an electrostatic latent image on the surface of the photosensitive drum 151. The developing portion 154 is a developing unit that develops the electrostatic latent image formed on the photosensitive drum 151, by using toner. The developing portion 154 forms a toner image based on the electrostatic latent image on the photosensitive drum 151. The transfer portion 155 transfers the toner image formed on the photosensitive drum 151 by the developing portion 154, onto the recording sheet P. The fixing portion 157 fixes the toner image onto the recording sheet P by heating the recording sheet P onto which the toner image has been transferred by the transfer portion 155.

Next, an example of a hardware structure of the image forming apparatus 100 will be described with reference to FIG. 10.

The touch panel device 300, the document reading portion 120, the document feeding portion 130, the image forming portion 150, and the conveyance portion (the sheet feed roller 162, the conveying roller 181, and the discharge roller 182) of the image forming apparatus 100 are connected to a control portion 200, and their operations are controlled by the control portion 200. In addition, a storage portion 171 and an image processing portion 172 are connected to the control portion 200.

The control portion 200 is an information processing portion such as a microcomputer having a ROM (Read Only Memory), a RAM (Random Access Memory), and the like. The ROM has, stored therein, a control program for controlling operation of the image forming apparatus 100. The control portion 200 reads out the control program stored in the ROM, and expands the control program on the RAM, thereby controlling the entire apparatus in accordance with predetermined instruction information inputted from the touch panel device 300.

The storage portion 171 is a storage portion such as a semiconductor memory, an HDD (Hard Disk Drive), or the like. In the storage portion 171, image data obtained by the document reading portion 120 reading a document is stored.

The image processing portion 172 performs predetermined image processing for the image data. For example, the image processing portion 172 performs expansion/reduction processing, and image improvement processing such as density adjustment or tone adjustment, for example.

Figure 10:
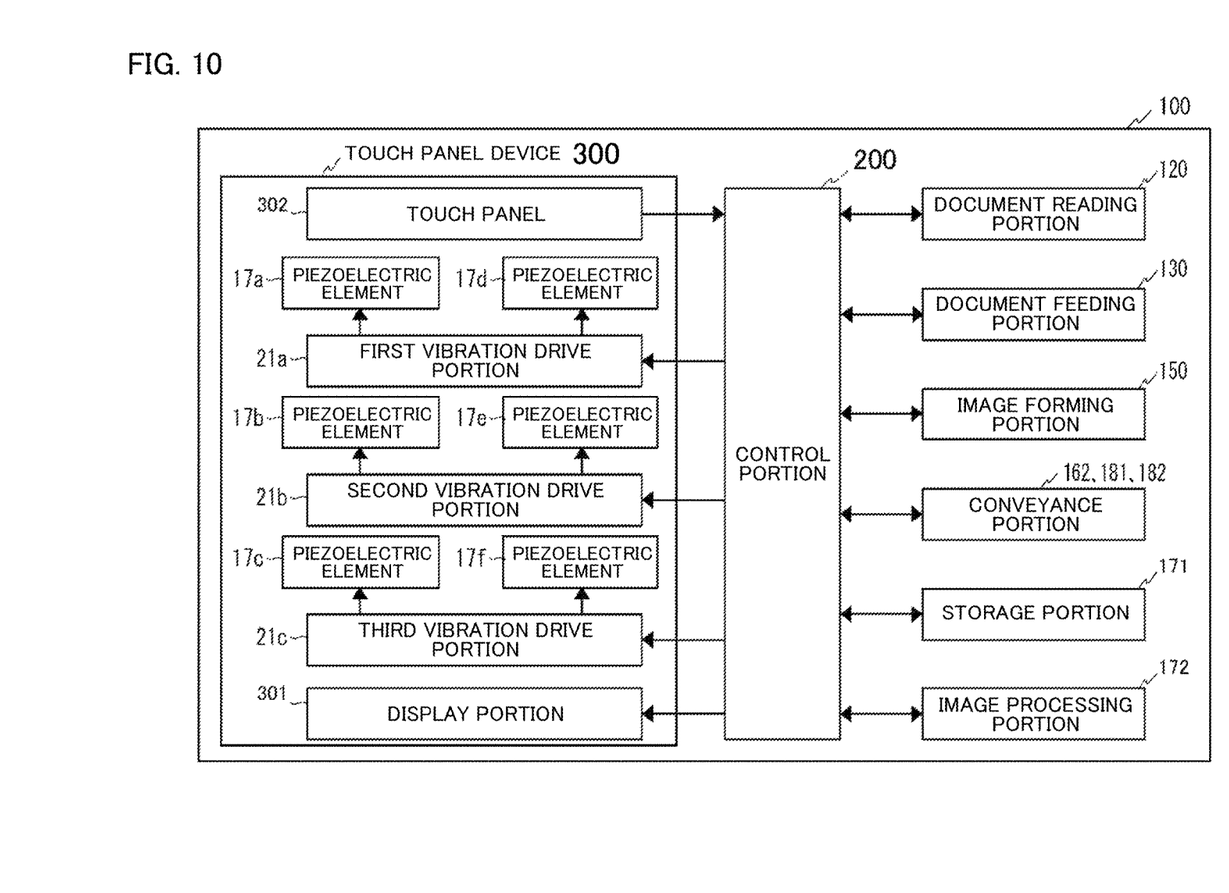
FIG. 10 is a block diagram showing an internal structure of the image forming apparatus shown in FIG. 9.

With reference to FIG. 10, the touch panel device 300 is provided with: a first vibration drive portion 21a which drives a piezoelectric element pair composed of the piezoelectric element 17a and the piezoelectric element 17d disposed so as to oppose each other in the short-side direction of the piezoelectric elements, by inputting, one or several times, a drive signal of a predetermined voltage waveform to the piezoelectric elements; a second vibration drive portion 21b which drives a piezoelectric element pair composed of the piezoelectric element 17b and the piezoelectric element 17e disposed so as to oppose each other in the short-side direction; and a third vibration drive portion 21c which drives a piezoelectric element pair composed of the piezoelectric element 17c and the piezoelectric element 17f disposed so as to oppose each other in the short-side direction. In response to a touch input to the touch panel 302, the vibration drive portions 21a to 21c input, one or several times, the drive signal of the same voltage waveform determined in advance, to the piezoelectric elements 17a to 17f on the basis of control of the control portion 200, thereby vibrating the touch panel 302.

In the case where the touch panel 302 is flat, if the vibration drive portions 21a to 21c cause all the piezoelectric elements 17a to 17f to have the same vibration, the vibrations are uniformly transferred, and vibration waves are canceled out each other due to interference thereof in the center portion and the like, whereby the vibrations are canceled out each other. In contrast, the touch panel 302 of the present embodiment is configured such that the center portion of the touch panel 302 in the long-side direction curves upward by setting the heights of the elastic members 14a to 14h at different two levels. Thus, propagation of the vibration waves changes, and canceling of the vibration waves due to interference is reduced, whereby uniform tactile sensation can be realized.

In the present embodiment, the heights of the elastic members 14*a* to 14*h* are set at different two levels so that the center portion of the touch panel 302 in the long-side direction curves upward. However, the number of the elastic members, i.e., the fixing surfaces, and the levels of the heights thereof can be set as appropriate. For example, the touch panel 302 may be curved to be corrugated by imparting unevenness to the touch panel 302, or the heights of the elastic members 14*a* to 14*h* may be irregularly varied to curve the touch panel 302 in a more complicated manner.

The present invention is not limited to the above described embodiments and can be modified as appropriate within a scope of technical idea of the present invention. Moreover, the number, positions, shapes and the like of the above described constituent features are not limited to the embodiments, and the number, positions, shapes and the like that are preferable for practicing the present invention can be selected.

The invention claimed is:

1. A display input device comprising:
   a display;
   a touch panel provided on an upper surface of the display and configured to detect a position of a touch operation;
   a plurality of piezoelectric elements comprises a first plurality and a second plurality of piezoelectric elements, wherein the first plurality of piezoelectric elements is provided on a front surface of the touch panel and the second plurality of piezoelectric elements is provided on a back surface of the touch panel so as to reduce a cancellation of vibration waves due to interference of the vibration waves produced when driving the first plurality and the second plurality of piezoelectric elements; and
   a signal driver configured to drive the piezoelectric elements in accordance with a touch operation on the touch panel, thereby to vibrate the touch panel, wherein
   the plurality of piezoelectric elements include three piezoelectric elements disposed at a predetermined interval in a long-side direction of the touch panel, and
   among the three piezoelectric elements, the piezoelectric element positioned at the center and the piezoelectric elements positioned at both ends are disposed in a divided manner on the front surface and the back surface of the touch panel, respectively.

2. The display input device according to claim 1, wherein the plurality of piezoelectric elements include six piezoelectric elements disposed at a predetermined interval in the long-side direction so as to oppose each other in a short-side direction of the touch panel, at opposing ends of the touch panel in the short-side direction.

3. The display input device according to claim 1, wherein the signal driver is able to simultaneously input a drive signal of the same voltage waveform determined in advance, to the respective piezoelectric elements.

4. An information processing apparatus including the display input device according to claim 1.

* * * * *